(12) United States Patent
Pieger (10) Patent No.: US 11,428,319 B2
(45) Date of Patent: Aug. 30, 2022

(54) BUILD CYLINDER ARRANGEMENTS FOR MACHINES FOR LAYERED PRODUCTION OF THREE-DIMENSIONAL OBJECTS HAVING A FIBER METAL SEAL

(71) Applicant: TRUMPF Laser- und Systemtechnik GmbH, Ditzingen (DE)

(72) Inventor: Markus Pieger, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 804 days.

(21) Appl. No.: 16/226,739

(22) Filed: Dec. 20, 2018

(65) Prior Publication Data

US 2019/0128419 A1 May 2, 2019

Related U.S. Application Data

(63) Continuation of application No. PCT/EP2017/064468, filed on Jun. 14, 2017.

(30) Foreign Application Priority Data

Jun. 23, 2016 (DE) .................. 102016211214.7

(51) Int. Cl.
  *B33Y 30/00* (2015.01)
  *F16J 1/00* (2006.01)
  (Continued)

(52) U.S. Cl.
  CPC ............. *F16J 1/008* (2013.01); *B22F 1/0003* (2013.01); *B22F 12/00* (2021.01); *B33Y 10/00* (2014.12);
  (Continued)

(58) Field of Classification Search
  CPC ...... B22F 12/00; B22F 2999/00; B22F 3/002; B22F 3/03; B22F 5/106; B22F 10/10;
  (Continued)

(56) References Cited

U.S. PATENT DOCUMENTS

| 4,381,173 A | 4/1983 | Freling |
| 7,045,237 B2 | 5/2006 | Sridhar |

(Continued)

FOREIGN PATENT DOCUMENTS

| CN | 88101275 A | 3/1988 |
| CN | 1646449 A | 7/2005 |

(Continued)

OTHER PUBLICATIONS

CN Office Action in Chinese Appln. No. 201780039200, dated Jul. 10, 2020, 15 pages (with English translation).

(Continued)

*Primary Examiner* — Jie Yang
(74) *Attorney, Agent, or Firm* — Fish & Richardson P.C.

(57) ABSTRACT

Build cylinder arrangements for machines for the layered production of three-dimensional objects by sintering or melting with a high-energy beam, of powdered material, are disclosed and have a base member and a piston that can be moved on an inner side of the base member along a central axis of the base member. The piston has at its upper side a substrate for building a three-dimensional object, and on the piston is a seal in abutment with the inner side of the base member for sealing the powdered material. The seal is a circumferential fiber metal seal of metal fibers that are pressed together and the pressed metal fibers are arranged with resilient compression stress between the piston and the inner side of the base member.

20 Claims, 5 Drawing Sheets

(51) Int. Cl.

| | | |
|---|---|---|
| *F16J 15/08* | (2006.01) | |
| *B22F 12/00* | (2021.01) | |
| *B33Y 10/00* | (2015.01) | |
| *B33Y 70/00* | (2020.01) | |
| *B22F 1/00* | (2022.01) | |
| *B22F 10/10* | (2021.01) | |

(52) U.S. Cl.
CPC ............... *B33Y 30/00* (2014.12); *B33Y 70/00* (2014.12); *F16J 15/0812* (2013.01); *B22F 10/10* (2021.01); *B22F 2999/00* (2013.01); *Y02P 10/25* (2015.11)

(58) Field of Classification Search
CPC ........ B22F 10/28; B22F 1/0003; B33Y 10/00; B33Y 30/00; B33Y 70/00; F16J 15/0812; F16J 1/008; Y02P 10/25
USPC ............................................................. 75/10
See application file for complete search history.

(56) References Cited

U.S. PATENT DOCUMENTS

| | | | |
|---|---|---|---|
| 10,220,568 | B2 | 3/2019 | Ederer |
| 10,413,968 | B2 | 9/2019 | Pialot et al. |
| 2003/0157386 | A1 | 8/2003 | Gottmann et al. |
| 2007/0023977 | A1 | 2/2007 | Braun et al. |
| 2010/0101490 | A1 | 4/2010 | Bokodi |
| 2014/0361496 | A1 | 12/2014 | Koichi et al. |
| 2015/0202687 | A1 | 7/2015 | Pialot et al. |
| 2017/0348911 | A1* | 12/2017 | Bruggeman ............. H05B 6/44 |
| 2018/0133800 | A1 | 5/2018 | Pieger |

FOREIGN PATENT DOCUMENTS

| | | |
|---|---|---|
| CN | 101260939 A | 9/2008 |
| CN | 102 107 254 | 6/2011 |
| CN | 104081104 A | 10/2014 |
| CN | 104640652 A | 5/2015 |
| CN | 107810102 A | 3/2018 |
| DE | 695 579 | 8/1940 |
| DE | 295 06 204 | 7/1995 |
| DE | 103 42 880 | 4/2005 |
| DE | 10 2013 012 032 | 1/2015 |
| DE | 10 2013 018 031 | 6/2015 |
| DE | 10 2015 211 538 | 12/2016 |
| EP | 0 248 132 | 8/1990 |
| EP | 0453068 A2 * | 10/1991 ............. F01N 13/16 |
| EP | 1 347 853 | 10/2005 |
| EP | 2 732 890 | 5/2014 |
| EP | 2 789 890 | 10/2014 |
| EP | 2 926 927 | 10/2015 |
| JP | 2015 151566 | 8/2015 |
| WO | WO 2016/150721 | 9/2016 |
| WO | WO 2016/207 258 A1 | 12/2016 |

OTHER PUBLICATIONS

CN Search Report in Chinese Appln. No. 201780039200, dated Jul. 5, 2020, 5 pages (with English translation).

CN Office Action in Chinese Appln. No. 201780039200, dated Aug. 9, 2021, 15 pages (with English translation).

Encyclopedia of the Chemical Industry, vol. 8 "Metal Fiber," vol. 8, Chemical Industry Press, Sep. 1994, 689-91 (with English translation).

International Preliminary report on Patentability in International Application No. PCT/EP2017/064468, dated Jan. 3, 2019, 8 pages (English translation).

International Search Report and Written Opinion in International Application No. PCT/EP2017/064468, dated Sep. 1, 2017, 24 pages (with English translation).

Metalldraht-Gestrick-Elastomer-Dichtungen, Datenblatt 4020 MWE, EMC Technik, 2011 . URL: http://www.emc-technik.de/ .. ./4020% 20MWE, %20Metalldraht-Gestrick-ElastomerDichtungen [abgerufen am Mar. 15, 2017]. 8 pages (with English translation).

* cited by examiner

BUILD CYLINDER ARRANGEMENTS FOR MACHINES FOR LAYERED PRODUCTION OF THREE-DIMENSIONAL OBJECTS HAVING A FIBER METAL SEAL

CROSS REFERENCE TO RELATED APPLICATIONS

This application is a continuation of and claims priority under 35 U.S.C. § 120 from PCT Application No. PCT/EP2017/064468 filed on Jun. 14, 2017, which claims priority from German Application No. 10 2016 211 214.7, filed on Jun. 23, 2016. The entire contents of each of these priority applications are incorporated herein by reference.

TECHNICAL FIELD

The disclosure relates to build cylinder arrangements for a machine for the layered production of three-dimensional objects by sintering or melting with a high-energy beam.

BACKGROUND

The layered production of three-dimensional objects by laser sintering or laser melting (also referred to as "selective laser sintering" or "selective laser melting") enables the production of object geometries that are not accessible using conventional techniques (which are based, for example, on a casting process or milling of a solid body). A thin layer of a powdered material is applied to a substrate (also referred to as a building platform) in a build cylinder and then heated at selected locations with a processing laser beam until the powdered material melts or sinters. Subsequently, the substrate in the build cylinder is lowered by a layer thickness of the powder, another layer of the powdered material is applied and in turn heated at selected locations by the processing laser beam, and so on. The application and the heating of the powdered material take place in most cases with the exclusion of air to prevent oxidation processes, such as when a metal powdered material is processed. A machine for the layered production of three-dimensional objects is described in EP 2 732 890 A2.

A similar procedure is also possible with an electron beam that locally sinters or melts the powdered material.

A difficulty with the procedure described is the movement of the substrate in the build cylinder with the powdered material present. On the one hand, powdered material should not be lost unnecessarily and, on the other hand, the powdered material may bring about leakages in the build cylinder that result in an undesirable introduction of air into the object to be produced. To prevent mechanical stresses in the finished component, it is additionally advantageous to preheat the powdered material before the action of the processing laser beam.

EP 1 347 853 B1 discloses an apparatus for the layered production of three-dimensional objects using laser melting, where an operating chamber is arranged in an air-tight chamber. The operating chamber is provided with a build cylinder. A piston in the build cylinder is sealed with respect to the build cylinder with metal piston rings of cast iron. Heating components are provided above and below a target face.

Metal piston rings of cast iron are in principle suitable for bringing about a good sealing of the powdered material, where they can also be used at high temperatures. However, the metal piston rings must be produced in a comparatively precise manner to prevent gaps, for example, as a result of non-roundness. Since the metal piston rings are constructed oversize, they are in abutment with significant force against the inner side of the base member of the build cylinder so that the activation of the piston is very sluggish.

German published patent application 10 2015 211 538.0 describes a piston with a powder seal of ceramic fibers, for example $Al_2O_3$ fibers, by which the powdered material can be retained. Ceramic fibers are, however, non-resilient, which can impair the sealing action. In addition, broken-off fiber particles can contaminate the powdered material and thus impair the quality of the finished three-dimensional object. When using graphite fiber felts as a powder seal in the 3D printing machines, the graphite fibers at higher temperatures (>350°) in atmospheric oxygen are in addition no longer oxidation-resistant, which can impede cylinder changing processes.

EP 0 248 132 B1 discloses a metal fiber structure by which a gas flow in a rotary compressor or a turbine can be blocked. The metal fiber structure is of annular shape. Another fiber metal seal for a gas turbine is known from U.S. Pat. No. 4,381,173.

SUMMARY

This disclosure features build cylinder arrangements for layered production systems used to produce three-dimensional objects, wherein the build cylinder arrangements provide a simple and resistant sealing of pistons of the system with respect to powdered materials, and where the quality of the produced three-dimensional objects is not impaired. In one aspect, this disclosure features a build cylinder arrangement that includes a seal for sealing the powdered material formed as a circumferential fiber metal seal of metal fibers that are pressed together, where the pressed metal fibers are arranged with resilient compression stress between the piston and the inner side of the base member.

The disclosure proposes configuring a powder seal on the piston from a fiber metal seal. This seal contains a large number of metal fibers (metal wires) that are resilient per se and have been pressed together and after the pressing form a unitary sealing member that can be handled as a whole. The deformation during compression is, as a result of the metal material of the fibers, partially plastic to achieve a good fiber cohesion, but also partially resilient.

The resilient deformation of the pressed piece decreases again after the compression or the pressed piece expands slightly ("rebound"), and occurrences of bending of the metal fibers substantially decrease. The rebound takes place not only in the direction of the compression (such as in the axial direction), but also in other directions (such as in radial direction and azimuthal direction). To achieve a particularly large rebound action, the compression is carried out when the fiber metal seal is produced in a typically cold state (e.g., cold deformation without additional heating, at ambient temperature). The fiber metal seal is accordingly (within specific limits) structurally flexible.

The fiber metal seal may then under resilient tension, e.g., radial resilient compression stress, be clamped between the piston and the inner side of the base member of the build cylinder. A good dual-sided abutment is thereby achieved, even if occurrences of unevenness or non-roundness exist at the inner side of the base member or on the support for the fiber metal seal on the outer side of the piston; even individual abutting powder particles can be compensated for and do not lead to azimuthal gap formation. The required force for a resilient deformation is relatively low, because this is based substantially on the bending deformation of the metal fibers; accordingly, the piston can be activated comparatively easily. Via the resilient deformation of the fiber metal seal, the different thermal expansions of the piston and base member (caused by the materials used or also as a result of temperature differences in the event of rapid displacement of the piston), or locally different thermal expansions in the piston or in the base member as a result of temperature gradients, can be well compensated. Slight tilting of the substrate with respect to the base member can also be compensated, for example, during the adjustment of the substrate.

Via the quantity of the pressed metal fiber material in the sealing member volume, the density and consequently the permeability with respect to the—mostly metal—powdered material can be adjusted. It should be noted that for sealing against a powder, relatively low densities are already sufficient. The density should also not be selected to be too high to avoid excessively limiting the resilient deformation region. The metal fibers are typically constructed with a diameter between 0.1 mm and 0.4 mm, e.g., between 0.2 mm and 0.25 mm. A typical density of the pressed metal fibers is between 30% and 60%, e.g., around approximately 40%. At these measurements, a good resilient behavior has been produced. The fiber metal seal is typically impermeable to powder particles with a diameter between 25 μm and 100 μm, but is not gas-impermeable.

The metal fibers typically form (before the pressing operation) a meshed or knitted fabric, whereby a particularly good cohesion of the fibers is achieved so that individual fibers cannot become detached and cannot be introduced into the powdered material. The pressing of the metal fibers is typically carried out in a special tool in advance, where the space remaining in the fully compressed state for the metal fibers typically corresponds substantially to the space on the assembled build cylinder for the fiber metal seal (at ambient temperature). The pressing of the metal fibers during the production of the fiber metal seal is typically carried out in an axial direction.

When the metal fibers are pressed (both in the production of the fiber metal seal and when the fiber metal seal is introduced into the build cylinder) and also during operation (when the piston is moved, including the fiber metal seal in the base member), there is generally no or very little fiber breakage since the fibers are not brittle due to their metal properties.

The metal material of the fibers is suitable for also being used at higher temperatures (≥500° C.) (in contrast, for example, to elastomer materials). Subjecting the fibers in a hot state to atmospheric oxygen can also be enabled by appropriate selection of the metal fiber material (in contrast, for example, to graphite fibers that burn off at higher temperatures).

In some embodiments, a laser beam is typically a high-energy beam; alternatively, an electron beam (with operation in a vacuum) is also possible. The high-energy beam is sufficient to melt a layer of the powdered material.

In some embodiments of the build cylinder arrangement, the metal fibers are pressed together to form a knitted metal fabric. The loops that are formed during the knitting operation permit a good cohesion of the metal fibers. On the whole, only a few individual fibers are used; fiber ends are produced primarily only by cutting operations. Accordingly, hardly any individual fibers can become detached from the fiber metal seal and get into the powdered material and contaminate it. Consequently, a good quality of the finished three-dimensional object is possible.

In some embodiments, the knitted metal fabric is constructed as a circumferentially closed knitted stocking. The circumferential knitted stocking may be constructed in a substantially rotationally symmetrical manner in accordance with the piston periphery that is intended to be sealed, and without azimuthal ends, whereby a uniform sealing action is achieved.

In some embodiments, the fiber metal seal is resiliently compressed by the base member at ambient temperature with respect to the diameter thereof by at least 0.4 mm and/or at least 0.8%. This compression is generally sufficient to compensate for play that is brought about by thermal expansion between the piston and base member and thus also at higher temperatures maintains a good sealing action for the powdered material.

In some embodiments, the fiber metal seal is constructed with regard to its material and/or density such that a thermal expansion of the inner diameter of the base member and a thermal expansion of the outer diameter of the fiber metal seal between ambient temperature (RT) and the operating temperature (ET) differ from each other by a maximum of a factor of 2, e.g., by a maximum of a factor of 1.5, with 500° C.≤ET≤1000° C. The similar thermal expansions or thermal expansion coefficients can ensure that the powder seal can follow the base member to a sufficient degree that the sealing action is maintained even at the operating temperature. The operating temperature is substantially determined by the desired temperature of the powdered material.

In some embodiments, the fiber metal seal is inserted into a groove at the outer side of the piston, where the fiber metal seal radially overhangs the groove. This geometry is advantageous for a secure axial fit of the fiber metal seal.

In some embodiments, the groove is constructed by a first seal carrier portion and a second seal carrier portion that can be rotated with a bayonet-type mechanism with respect to the first seal carrier portion. For example, one of the seal carrier portions forms a "shoulder" and one of the seal carrier portions forms a "cover". The two-part construction prevents a significant (potentially partially plastic) deformation of the fiber metal seal when fitting the fiber metal seal to the piston, and the fiber metal seal can abut tightly in the groove.

In some embodiments, the fiber metal seal is produced from a material which at operating temperature ET is resistant to corrosion in atmospheric oxygen, with 500° C.≤ET≤1000° C. A change of the build cylinder (or a portion thereof) on a machine for layered production of three-dimensional objects is facilitated or possible in an accelerated manner. The fiber metal seal can in the hot state be subjected to atmospheric oxygen without becoming damaged. Accordingly, with a change of the build cylinder (or a portion thereof), it is not necessary to wait until it has cooled if during the change the seal (typically from the side facing away from the finished object) comes into contact with atmospheric oxygen.

In some embodiments, the fiber metal seal is produced from a material in which a yield strength $R_{p,0.2}^{ET}$ (at the operating temperature ET) is at least 75% of the yield strength $R_{p,0.2}^{RT}$ (at ambient temperature RT) after the fiber metal seal has been kept for 100 hours at the operating temperature ET, with 500° C.≤ET≤1000° C. Alternatively or additionally, the absolute value of the yield strength $R_{p,0.2}^{ET}$ after 100 hours is at least 100 MPa. This material selection ensures that the resilient compression stress with which the fiber metal seal presses on the base member is also substantially still maintained at the operating temperature and consequently the sealing is ensured.

In some embodiments, the fiber metal seal is produced from a high-grade steel such as Ni-containing high-grade steel, or a Ni alloy such as Hastelloy® or Inconel®, e.g., precipitation-hardened Inconel 718. The high corrosion resistance and low material softening at relatively high temperature make these materials particularly suitable.

In some embodiments, the substrate and the seal for sealing the powdered material to be constructed is on an upper portion of the piston, which is releasably arranged on a remaining portion of the piston with a clamping mechanism and/or a torsion prevention means. In the remaining portion of the piston is a heating device by which the substrate can be heated to operating temperature ET, where 500° C.≤ET≤1000° C. The removability of the upper portion (divisibility of the piston), when changing the object to be produced permits the remaining portion of the piston to be used with different build cylinder arrangements. Only one heating device is required. In some embodiments, the remaining portion includes a central portion of the piston in which the heating device for tempering the substrate is provided. The remaining portion can further include a lower portion of the piston, in which a cooling device for cooling the piston is provided. Thermal insulation can be provided between the central portion and the lower portion (e.g., a ceramic plate). The lower portion of the piston can be constructed with a circumferential seal that is in abutment with the inner side of the base member for sealing gas and is produced completely or partially from an elastomer material. In this structural form, the gas tightness of the piston with respect to the base member during building operation via the seal for sealing gas ("gas seal") on the lower portion can be ensured; the elastomer material used at that location permits a high sealing action. The use of the temperature-sensitive elastomer material is possible since, by the thermal insulation with respect to the central portion (which contains the heating device) and the cooling device in the lower portion, at that location a comparatively low temperature can be configured, much lower than in the region of the seal for sealing the powdered material ("powder seal") in the upper portion.

The seal for sealing gas can be constructed as a hydraulic or pneumatic seal whose outer diameter can be adjusted by a pressure of hydraulic fluid or gas in the seal. It is thereby possible when withdrawing or introducing the lower portion from/in the base member of the build cylinder arrangement for the gas seal to be radially pulled together so that it does not impede the movement of the piston and also reduces risk of damage to the gas seal.

In some embodiments, the base member includes an insulation member that is in the form of a cylindrical jacket and that forms at least the inner side of the base member. The insulation member is made from a material with a specific thermal conductivity $\lambda_{IK}$, with $\lambda_{IK} \leq 3$ W/(m*K). The material of the insulation member can be, for example, a ceramic material or a glass, e.g., quartz glass such as opaque quartz glass. This reduces heat transfer through the base member so that a lower portion of the piston and a gas seal at that location is subjected to no or only a small thermal input via the base member.

This disclosure also includes machines for the layered production of three-dimensional objects by laser sintering or laser melting of powdered material that include a process chamber to which a storage cylinder arrangement for the powdered material and a build cylinder arrangement having a substrate for building a three-dimensional object are connected, and in which a sliding member for applying a layer of the powdered material from the storage cylinder arrangement to the substrate of the build cylinder arrangement is arranged; a processing laser for producing a processing laser beam or a coupling device for a processing laser beam; and an optical scanner unit for scanning the processing laser beam over the substrate. These machines can include an exchange mechanism with which the base member together with the substrate including the three-dimensional object produced thereon and the seal for sealing the powdered material can be replaced with an additional base member together with an additional substrate and an additional seal for sealing the powdered material for the production of a next three-dimensional object on the additional substrate. With these machines, it is possible to produce three-dimensional objects rapidly in sequence. As a result of the replacement of the base members together with the substrate, finished object, and seal, it is possible to begin production of the new three-dimensional object even when the three-dimensional object previously produced has not yet cooled. As a result of the base member, the substrate, the seal, and typically a cover that closes the top, the object can be, to a given degree, protected from atmospheric oxygen, if required. The seal for sealing the powdered material is produced from metal fibers by which (in contrast to graphite fibers) any contact with atmospheric oxygen at high temperatures does not lead to damage or destruction of the seal.

Other advantages will be appreciated from the description and the drawings. The features mentioned above and those set out below can also be used individually per se or together in any combinations. The embodiments shown and described are not intended to be understood to be a definitive listing, but instead are of an exemplary.

DETAILED DESCRIPTION

Figure 1:
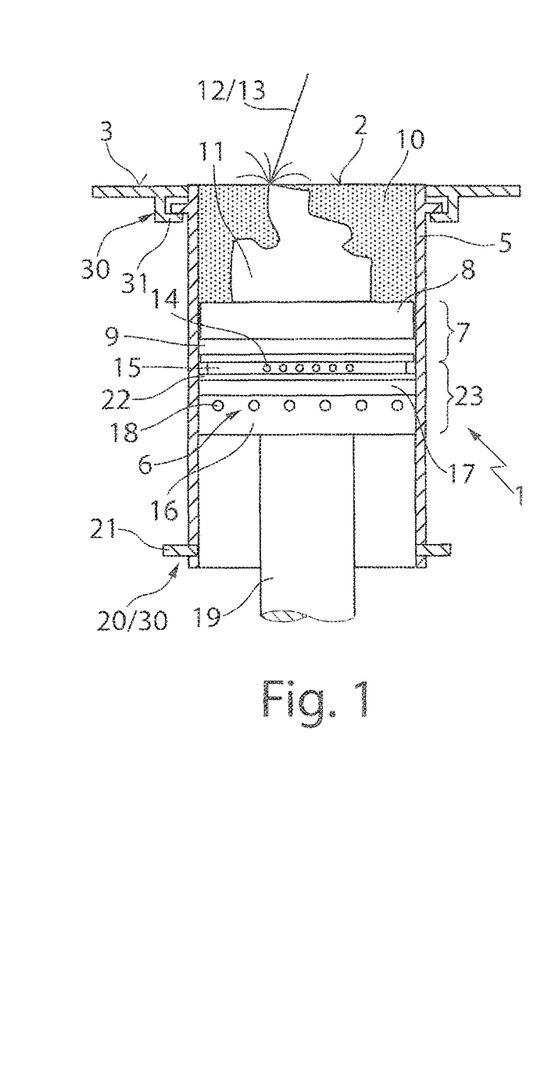
FIG. 1 is a schematic cross-section of an embodiment of a build cylinder arrangement, mounted on a process chamber, during a laser melting processing operation of an object to be produced.

FIG. 1 shows an embodiment of a build cylinder arrangement 1 that is fitted to an opening 2 in the base 3 of a process chamber. The build cylinder arrangement 1 is suspended via hooks 31 on the process chamber (illustrated only in FIG. 1); the hooks 31 are part of a replacement mechanism 30 for build chambers (see below).

The build cylinder arrangement 1 includes a base member 5 that at least at the inner side is a quartz glass of low thermal conductivity and has a circular-cylindrical-jacket-like form. Furthermore, the build cylinder arrangement 1 includes a piston 6 that can be moved in an axial direction (in FIG. 1, from the top to the bottom) in the base member 5. The piston 6 has an upper portion 7 on which a substrate 8 is constructed.

On the substrate 8, a three-dimensional object 11 is produced in a layered manner by upper-side powdered material 10 being scanned with a high-energy beam 12, e.g., a laser beam 13. The energy of the high-energy beam 12 is sufficient to melt an uppermost layer of the powdered material 10. The powdered material 10 is typically a metal powder with a mean particle size from 25 µm to 100 µm, e.g., with a D50 value of 40-60 µm.

Figure 6:
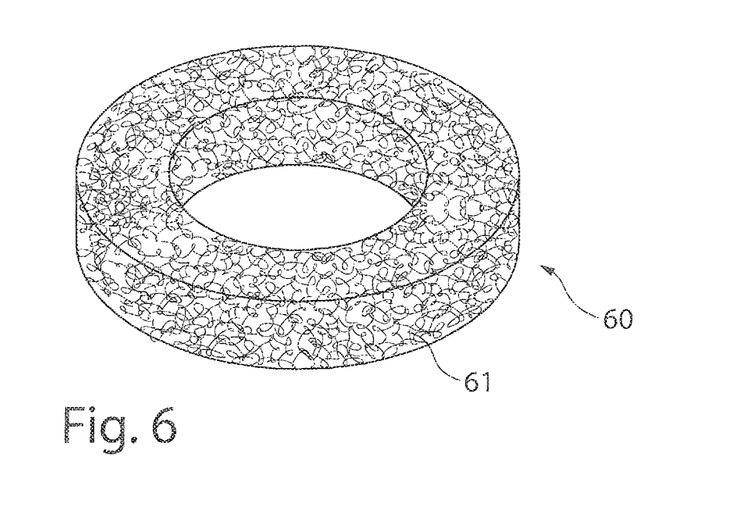
FIG. 6 is a schematic oblique view of a fiber metal seal.

The upper portion 7 of the piston 6 has a powder seal 9 for sealing the powdered material 10 that is a fiber metal seal (see FIG. 6). The powder seal 9 abuts with radial compression stress against the inner side of the base member 5.

The upper portion 7 of the piston 6 is positioned on a remaining portion 23 of the piston 6; both portions 7, 23 are clamped to each other in a reversible manner with a clamping device that is not illustrated in greater detail (and that is also a portion of the replacement mechanism 30) so that the two portions 7, 23 can be readily separated from each other and secured to each other.

In the remaining portion 23 of the piston 6 is a heating device 14 (e.g., with electric heating loops, only schematically illustrated in FIG. 1), by which the substrate 8 can be heated from below. Typically, an operating temperature of the substrate 8 and the powdered material 10 is between 500° C. and 1000° C. is adjusted, e.g., between 500° C. and 650° C.

In the embodiment shown, the remaining portion 23 of the piston 6 has a central portion 15 in which the heating device 14 is constructed and a lower portion 16 on which a gas seal 17 for sealing gas is arranged. The gas seal 17 is produced from an elastomer material, for example, from silicone, and can be inflated with gas pressure of an operating gas to increase its radius and thus to enable a tighter abutment on the base member 5 ("pneumatic seal"). In the lower portion 16 is a cooling device 18 (e.g., cooling coils for cooling water schematically illustrated in FIG. 1), by which the lower portion 16 and the gas seal 17 can be kept at a moderate temperature (e.g., around 100° C. or less). Thermal insulation 22 (e.g., a ceramic plate) is arranged between the central portion 15 and the lower portion 16. Secured to the lower portion 16 the arm 19 is a lifting device, by which the piston 6 can be axially moved.

During the production of the object 11, a protective gas atmosphere (for instance, $N_2$ or a noble gas such as argon) is in the process chamber and in the base member 5 around the object 11. The gas seal 17 prevents penetration of atmospheric oxygen from the environment.

On the base member 5 there is formed a lock mechanism 20 by which locks 21 can be radially extended and retracted. The lock mechanism 20 is also part of the replacement mechanism 30.

Figure 2:
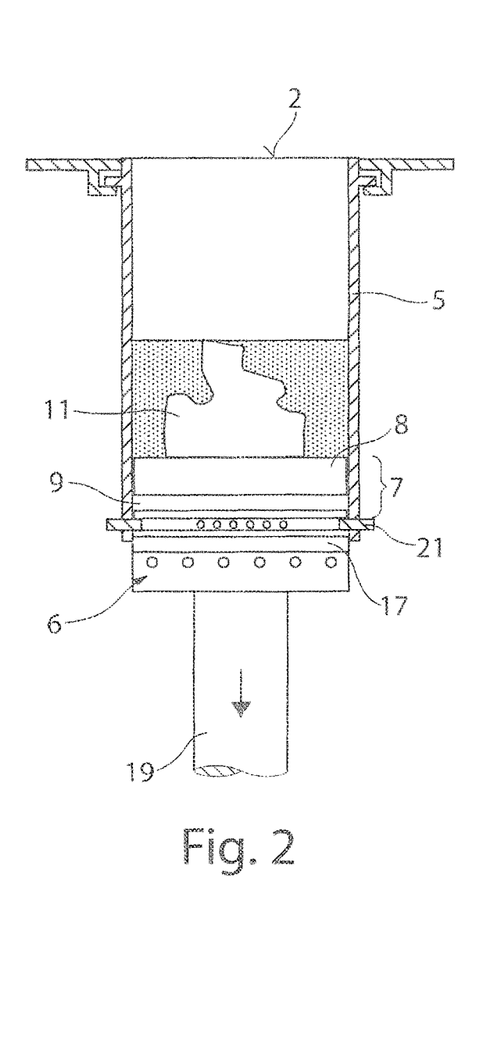
FIG. 2 shows the build cylinder arrangement of FIG. 1 after completion of the object with locks retracted.

Referring to FIG. 2, after completion of the three-dimensional object 11, the piston 6 is moved downwards until the lower side of the substrate 8 or of the upper portion 7 is axially just above the locks 21. Subsequently, the locks 21 are extended radially inwards.

The gas seal 17 has moved past the base member 5. The inner space of the build cylinder arrangement 1 is then still protected by the powder seal 9, and small quantities of atmospheric oxygen can reach the object 11. However, since no further melting processes take place, this small oxygen introduction is generally non-critical. If desired, a cover can be placed on the upper opening 2 to protect the process chamber located above from the introduction of oxygen.

Figure 3:
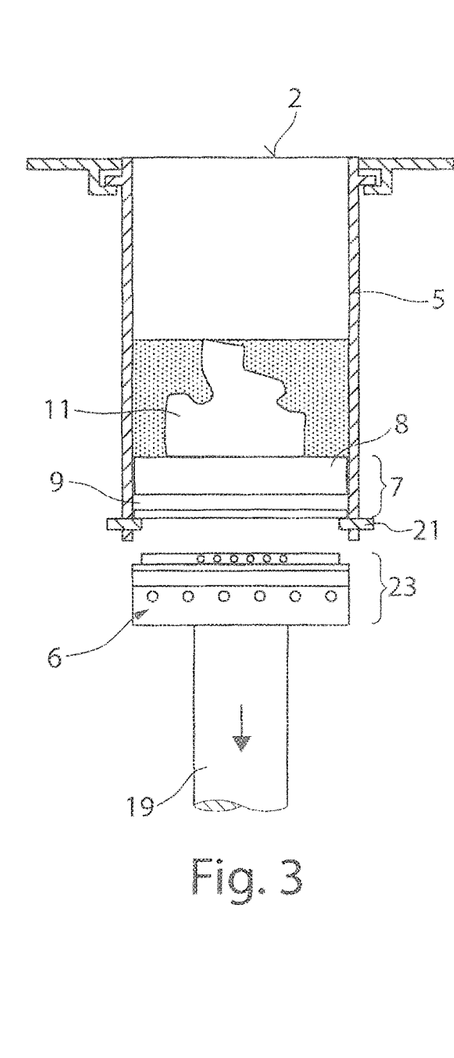
FIG. 3 shows the build cylinder arrangement of FIG. 1 after the piston has been separated between the upper portion and remaining portion.

Referring to FIG. 3, after the upper portion 7 and remaining portion 23 have been decoupled and the piston 6 has been lowered further, the piston 6 is separated. The upper portion 7 remains resting on the locks 21, and the remaining portion 23 of the piston 6 is retracted further.

Figure 4:
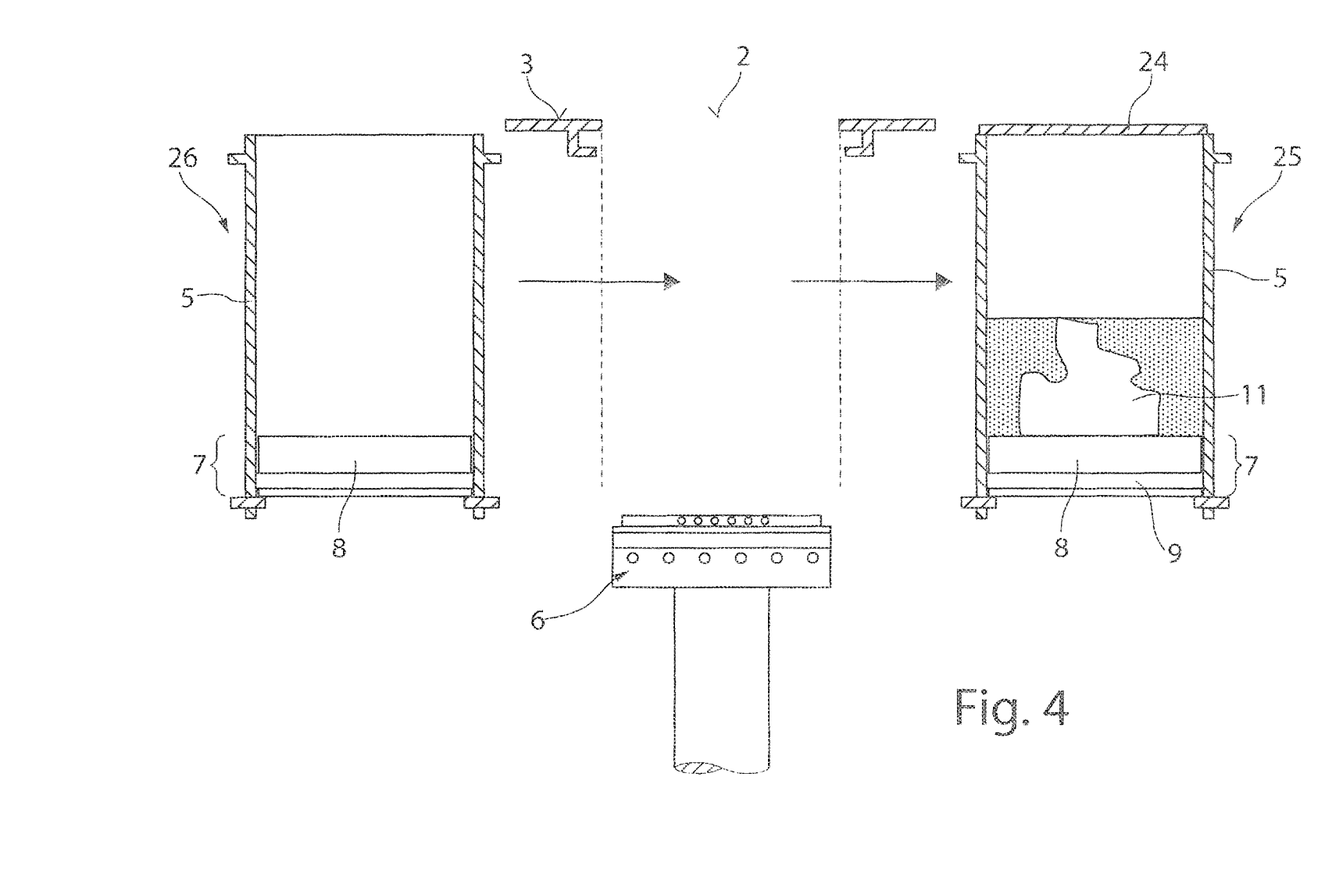
FIG. 4 is a schematic cross-section of the replacement of a portion of the build cylinder arrangement of FIG. 1 with a new empty build chamber.

Referring to FIG. 4, the build chamber 25 (the base member 5 together with the substrate 8 including the finished object 11 that is arranged thereon) and the powder seal 9 (closed with a cover 24), can be removed from the process chamber (see the base 3 thereof). The build chamber 25 and the object 11 are still hot at this time, e.g., at more than 500° C. As a result of the powder seal 9 and the cover 24, the protective gas atmosphere present inside is substantially maintained. The powder seal 9 may as a result of the metal material of its fibers withstand the atmospheric oxygen that acts from below. The cooling of the build chamber 25 and of the finished object 11 can then be carried out in a location remote from the process chamber in a cooling store, typically over a period of several hours.

At the same time, a new build chamber 26, with a new base member 5 and new upper portion 7 of the piston 6, is arranged at the opening 2 of the process chamber.

Figure 5:
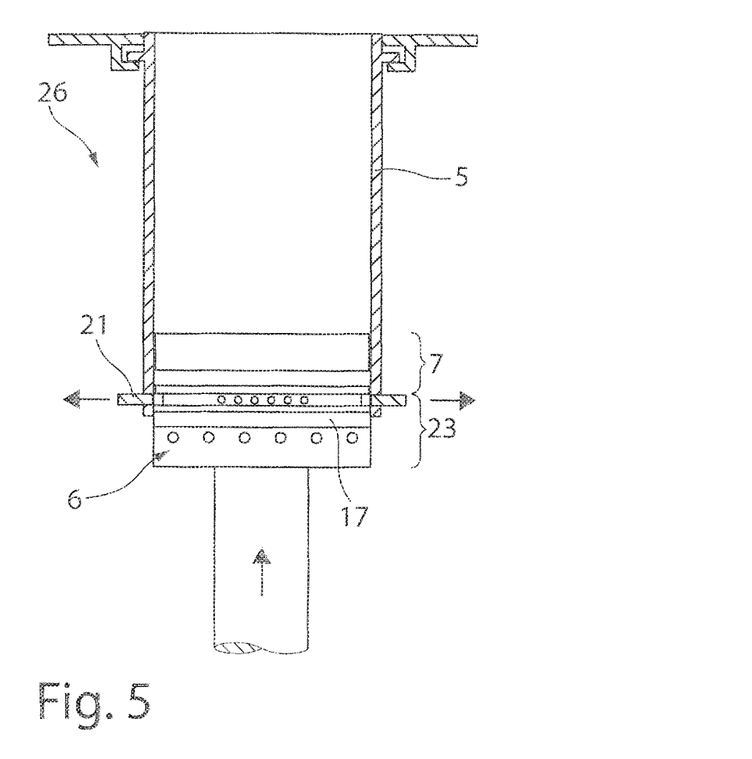
FIG. 5 shows the new, empty build chamber of FIG. 4 when the remaining portion of the piston is coupled.

Subsequently, the piston 6 or the remaining portion 23 thereof approaches from below the upper portion 7 of the piston 6 of the new build chamber 26, see FIG. 5. As soon as contact is established, the locks 21 can be retracted radially outwardly. When the piston 6 is lifted further, the lower portion 23 is introduced into the new base member 5. The gas seal 17 can be briefly relaxed to facilitate the introduction of the gas seal 17.

Subsequently, it is possible to begin the layered production of a new three-dimensional object on the substrate 8 of the new build chamber 26. It is not necessary to wait for the previously produced three-dimensional object 11 to be cooled (see FIG. 4).

FIG. 6 is a schematic oblique view of a fiber metal seal 60, as used in a build cylinder arrangement. The fiber metal seal 60 is constructed in a closed annular manner and includes metal fibers 61 that are pressed together. Typically, the metal fibers are already intertwined before compression, typically woven or knitted, and/or twisted and/or rolled up (not illustrated in greater detail).

To produce a fiber metal seal 60, the procedure is typically as follows: in step 1, circular knitting of a metal wire hose (also called knitted stocking) is first carried out, typically with a diameter of approximately 80 mm. In step 2, the hose is cut to a required axial length, if necessary. In step 3, the hose piece obtained is tapped to remove loose wire pieces caused by the cut, if required. In step 4, the hose piece is twisted to form a knitted cord. Subsequently, in step 5, the cord is placed in a pressure die (pressing tool) in a helical manner. Finally, in step 6 it is pressed into an annular shape.

Alternatively to steps 4 and 5, it is also possible to place the metal wire hose or hose piece directly or after axial rolling-up into a pressure die, where the hose piece is placed like a stocking over a core of the pressure die.

Figure 7A:
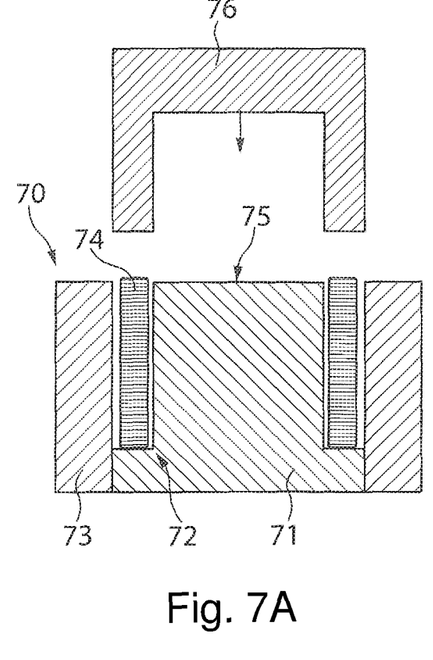
FIG. 7A is a schematic cross-section of a pressing tool for producing a fiber metal seal in the still-uncompressed state.

FIG. 7A is a schematic cross-section of a pressure die 70 by which a fiber metal seal can be produced. The rotationally symmetrical pressure die 70 includes an inner portion 71, which has a shoulder 72, and a substantially tubular outer portion 73. In the example shown, a metal wire hose 74 is placed over the core 75 of the pressure die 70. If desired, the core 75 can also be constructed in a conical manner towards the top (not illustrated) to facilitate placement of the metal wire hose 74. By lowering a pressing stamp 76, the metal wire hose 74 is pressed. In doing so, the metal wire hose is plastically and also resiliently deformed.

Figure 7B:
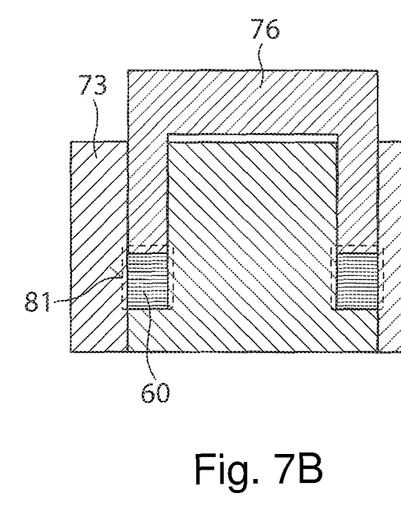
FIG. 7B shows the pressing tool of FIG. 7A in the compressed state.

As a result of the compression, the fiber metal seal 60 is obtained, FIG. 7B. After removing the pressing tool, there is a rebound (resilient expansion) of the fiber metal seal 60, see the contour lines 81 illustrated with broken lines, whereby the outer radius, the inner radius and the axial height of the seal 60 increase again.

This resilient deformation region ("resilient play") can be used to apply a resilient pressure in a radial direction to the fiber metal seal 60 in the mounted state in a build cylinder arrangement. On the one hand, the fiber metal seal is thereby in close abutment with the inner side of the base member and the outer side of the piston, on the other hand, different thermal expansions of the piston and base member can be compensated for to a given degree.

Figure 8A:
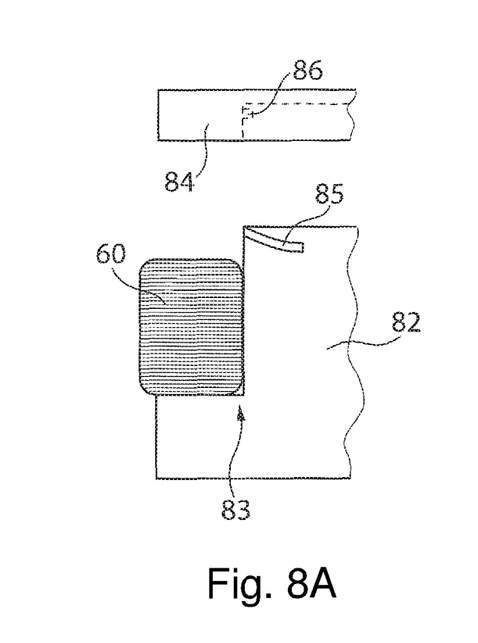
FIG. 8A is a schematic cross-section of a fiber metal seal in a two-part seal carrier with a bayonet-type mechanism in an open state.

FIG. 8A shows a first seal carrier portion 82 with a shoulder 83 and a second cover-like seal carrier portion 84 for the assembly of a fiber metal seal 60 on the piston 6, e.g., on the substrate 8. On the first seal carrier portion 82 is a guiding groove 85 for a guiding projection 86 on the second seal carrier portion 84; the guiding groove 85 and guiding projection 86 form a bayonet-type mechanism. It should be noted that typically at least two such guiding grooves 85 and guiding projections 86 are provided, where for reasons of simplicity, only one set is illustrated in FIG. 8A.

When the second seal carrier portion 84 is removed, the fiber metal seal can be placed without (or at most with only a little) deformation on the shoulder 83 of the first seal carrier portion 82.

Figure 8B:
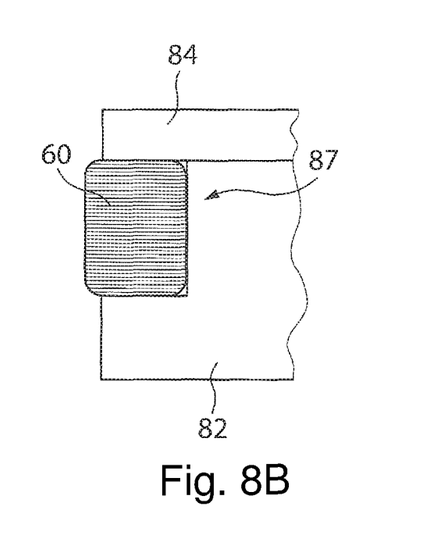
FIG. 8B shows the fiber metal seal and the seal carrier of FIG. 8A in a closed state.

Subsequently, the second seal carrier portion 84 can be clamped (twisted) on the first seal carrier portion 82 by the bayonet-type mechanism, to form a groove 87 in which the fiber metal seal 60 is retained or axially clamped, see FIG. 8B. It should be noted that the fiber metal seal 60 protrudes radially beyond the groove 87.

Figure 9:
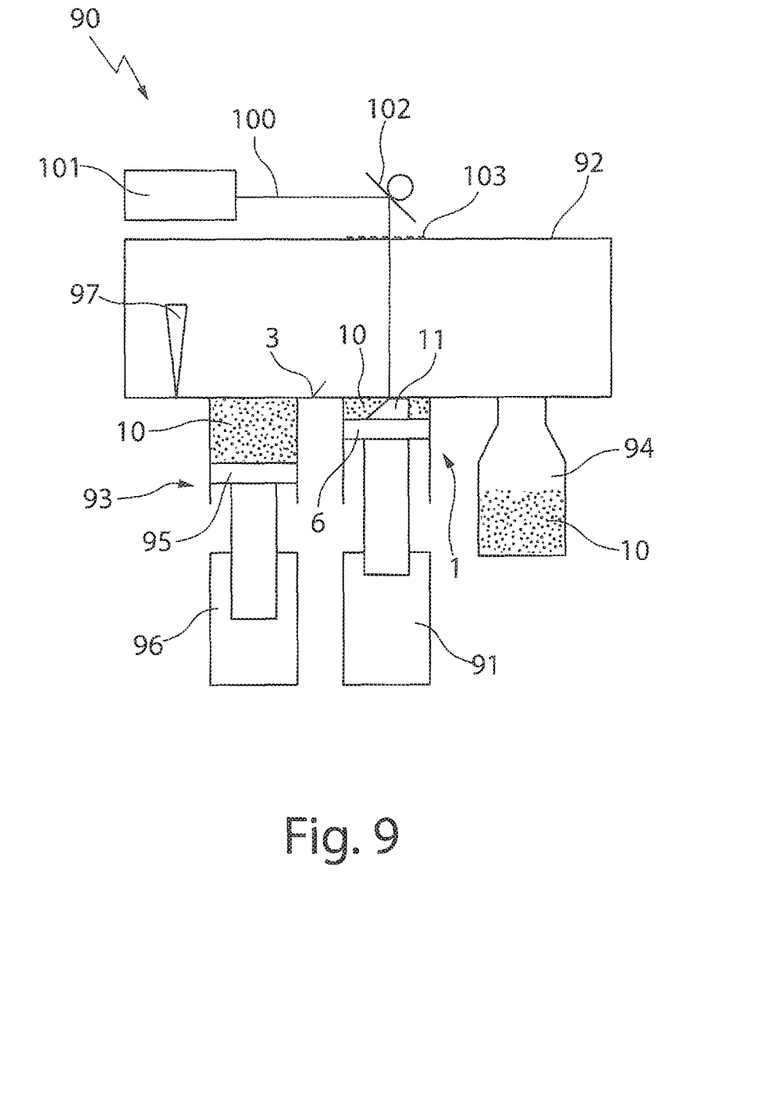
FIG. 9 is a schematic cross-section of a machine for the layered production of three-dimensional objects.

The wire material (material of the metal fibers) of the fiber metal seal preferably has a comparatively low thermal expansion, typically in accordance with the material of the base member (or the inner side thereof) of the build cylinder arrangement. The pretensioning can thereby be kept substantially constant even at the operating temperature. Generally, the thermal expansion of the wire material deviates by less than 20% from the thermal expansion of the material of the base member. The wire material should further be resistant to oxidation in atmospheric oxygen above 500° C., e.g., up to at least 600° C., so that when the build chamber is removed in the hot state the fiber metal seal does not burn off or otherwise become damaged. The wire material should further be selected in such a manner that the elastic modulus thereof when heated to the operating temperature drops only slightly, e.g., by less than 20% with respect to ambient temperature over (at least) 100 hours. Similarly, the yield strength ($R_{p,0.2}$) when heated should only decrease slightly, e.g., by less than 30% with respect to ambient temperature over (at least) 100 hours. Nickel-based alloys such as Inconel® 718 or Inconel® X750 or Nimonic® 90 are wire materials that can also comply with the above properties. FIG. 9 is a schematic side view of an embodiment of a machine 90 for the layered production of a three-dimensional object 11 (or of several three-dimensional objects).

The machine 90 includes a gas-tight process chamber 92 that can be filled and/or purged in a manner not illustrated in greater detail with an inert gas (protection gas), such as nitrogen, or a noble gas, such as argon.

Connected to the process chamber 92 is a storage cylinder arrangement 93 for a powdered material 10 (illustrated with dots) from which the three-dimensional object 11 is produced by laser sintering or laser melting. The powdered material 10 may, for example, include metal particles with a mean particle size (D50) of 25-100 μm. By stepwise raising a powder piston 95 with a powder lifting device 96, a small quantity of the powdered material 10 is raised over the level of the base 3 of the process chamber 92 so that, with a sliding member 97 that can be actuated in a motorized manner, this small quantity can be moved to a build cylinder arrangement 1 (for instance, constructed as illustrated in FIG. 1).

The build cylinder arrangement 1 that is also connected to the process chamber 92 has the piston 6, on which at the upper side (on the substrate) the three-dimensional object 11 is built up. Before the production of a new layer of the three-dimensional object 11, the piston 6 is lowered by a step with a lifting device 91 and a small quantity of the powdered material 10 is scraped with the sliding member 97 in the build cylinder arrangement 1.

Subsequently, the newly applied powder layer is locally illuminated from above with a processing laser beam 100 (e.g., from a local processing laser 101 and introducing through a window 103 into the process chamber 92) at locations that are designated for a local solidification (melting, sintering) of the powdered material 10, and thereby powerfully locally heated. The processing laser beam 100 is guided (scanned) over the substrate by an optical scanner unit 102 (containing one or more mirrors that on the whole can be pivoted about at least two axes).

Subsequently, additional layers are produced until the three-dimensional object 11 is complete. Excess powdered material 10 can be spread with the sliding member 97 into a collection container 94.

For a rapid sequence of the production of three-dimensional objects, the build cylinder arrangement 1 (or the base member thereof including the upper portion of the piston 6) can be replaced, as described in FIGS. 1 to 5.

LIST OF REFERENCE NUMERALS

1 Build cylinder arrangement
2 Opening (process chamber)
3 Base (process chamber)
5 Base member
6 Piston
7 Upper portion (piston)
8 Substrate
9 Seal for sealing the powdered material (powder seal)
10 Powdered material
11 Three-dimensional object
12 High-energy beam
13 Laser beam
14 Heating device
15 Central portion (piston)
16 Lower portion (piston)
17 Seal for sealing gas (gas seal)
18 Cooling device
19 Arm
20 Locking device
21 Lock
22 Thermal insulation 23 Remaining portion (piston)
24 Cover
25 Build chamber
26 New build chamber
30 Replacement mechanism
31 Hook
60 Fiber metal seal
61 Metal fiber
70 Pressure die (pressing tool)
72 Inner portion
72 Shoulder (inner portion)
73 Outer portion
74 Metal wire hose (knitted stocking)
75 Core
76 Pressing stamp
81 Contour lines (fiber metal seal after rebound)
82 First seal carrier portion
83 Shoulder (first seal carrier portion)
84 Second seal carrier portion
85 Guiding groove (bayonet type mechanism)
86 Guiding projection (bayonet type mechanism)
87 Groove
90 Machine
91 Lifting device
92 Process chamber
93 Storage cylinder arrangement
94 Collection container
95 Powder piston
96 Powder lifting device
97 Sliding member
100 Processing laser beam
101 Processing laser
102 Optical scanner unit (laser scanner)
103 Window

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A build cylinder arrangement for a machine for the layered production of three-dimensional objects by sintering or melting with a high-energy beam a powdered material, the build cylinder arrangement comprising:
   a base member;
   a piston configured to be moveable on an inner side of the base member along a central axis of the base member, wherein the piston comprises a substrate at an upper side thereof; and
   a seal for sealing the powdered material in abutment with the inner side of the base member, wherein the seal for sealing the powdered material comprises a circumferential fiber metal seal comprising metal fibers that are pressed together, wherein the pressed metal fibers are arranged with resilient compression stress between the piston and the inner side of the base member,
   wherein the substrate and the seal for sealing the powdered material are constructed on an upper portion of the piston, which is releasably arranged on a remaining portion of the piston,
   and wherein the remaining portion of the piston includes a heating device arranged to heat the substrate to an operating temperature defined as 500° C.≤operating temperature ≤1000° C.

2. The build cylinder arrangement of claim 1, wherein the metal fibers that are pressed together form a knitted metal fabric.

3. The build cylinder arrangement of claim 2, wherein the knitted metal fabric comprises a circumferentially closed knitted stocking.

4. The build cylinder arrangement of claim 1, wherein the fiber metal seal is resiliently compressed with respect to its diameter by at least 0.4 mm or by at least 0.8%, or both by at least 0.4 mm and by at least 0.8%, as a result of the introduction into the base member at ambient temperature.

5. The build cylinder arrangement of claim 1, wherein a material or density, or both a material and a density, of the fiber metal seal is selected such that a thermal expansion of the inner diameter of the base member and a thermal expansion of the outer diameter of the fiber metal seal between ambient temperature and the operating temperature differ by a maximum factor of 2.

6. The build cylinder arrangement of claim 5, wherein the thermal expansion of the inner diameter of the base member and the thermal expansion of the outer diameter of the fiber metal seal between ambient temperature and the operating temperature differ by a maximum factor of 1.5.

7. The build cylinder arrangement of claim 1, wherein the fiber metal seal is inserted into a groove at an outer side of the piston, and the fiber metal seal radially overhangs the groove.

8. The build cylinder arrangement of claim 7, wherein the groove is constructed by a first seal carrier portion and a second seal carrier portion that is rotatable with a bayonet-type mechanism with respect to the first seal carrier portion.

9. The build cylinder arrangement of claim 1, wherein the fiber metal seal comprises a material that is resistant to corrosion in atmospheric oxygen at the operating temperature.

10. The build cylinder arrangement of claim 1, wherein the fiber metal seal comprises a material having a yield strength $R_{p,0.2}^{ET}$ at the operating temperature that is at least 75% of yield strength $R_{p,0.2}^{ET}$ at ambient temperature after the fiber metal seal has been kept for 100 hours at the operating temperature.

11. The build cylinder arrangement of claim 1, wherein the fiber metal seal comprises a high-grade steel.

12. The build cylinder arrangement of claim 11, wherein the fiber metal seal comprises Ni-containing high-grade steel, or a Ni alloy.

13. The build cylinder arrangement of claim 1, wherein the upper portion of the piston is releasably arranged on the remaining portion of the piston with a clamping mechanism or a torsion prevention means, or both a clamping mechanism and a torsion prevention means.

14. The build cylinder arrangement of claim 1, wherein the remaining portion of the piston includes a central portion having the heating device arranged to heat the substrate to the operating temperature.

15. The build cylinder arrangement of claim 14, wherein the remaining portion further comprises a lower portion of the piston having a cooling device arranged to cool the piston, wherein a thermal insulation is provided between the central portion and the lower portion, and the lower portion of the piston has a circumferential seal in abutment with the inner side of the base member for sealing gas, wherein the circumferential seal is comprised at least partially of an elastomer material.

16. The build cylinder arrangement of claim 15, wherein the seal for sealing gas comprises a hydraulic or pneumatic seal whose outer diameter can be adjusted by a pressure of hydraulic fluid or gas in the seal.

17. The build cylinder arrangement of claim 1, wherein the base member comprises an insulation member that is substantially cylindrical and forms at least the inner side of the base member, wherein the insulation member is made of a material with a specific thermal conductivity ≤3 W/(m*K).

18. The build cylinder arrangement of claim 17, wherein the material of the insulation member is ceramic or glass.

19. The build cylinder arrangement of claim 18, wherein the glass is quartz glass.

20. The build cylinder arrangement of claim 19, wherein the quartz glass is opaque.

\* \* \* \* \*